T. COGSWELL.
SAFETY SWIVEL HOOKS OR PINS.

No. 183,489. Patented Oct. 24, 1876.

WITNESSES
C. W. Tuttle
E. A. Stock

INVENTOR
Thomas Cogswell
by J. W. Adams
Atty.

UNITED STATES PATENT OFFICE.

THOMAS COGSWELL, OF BOSTON, MASSACHUSETTS.

IMPROVEMENT IN SAFETY SWIVEL HOOKS OR PINS.

Specification forming part of Letters Patent No. 183,489, dated October 24, 1876; application filed September 11, 1876.

*To all whom it may concern:*

Be it known that I, THOMAS COGSWELL, of Boston, in the county of Suffolk and State of Massachusetts, have invented an Improved Safety Swivel Hook or Pin, of which the following is a specification:

My invention relates to an improvement in devices for holding up articles of apparel while being worn; and it consists in the combination, with a loop to which the suspender is attached, of a safety swivel hook or pin, so constructed and arranged that the pointed portion of the hook or pin will maintain a rigid position at right angles with the loop when the article of apparel is being attached to the hook; and, after being so attached, the hook or pin can be turned or swiveled so as to bring the point of the hook within a guard or shield, and thus prevent its catching in the dress; and the bend of the hook and the loop will be in the same parallel plane, or lie flat, so as to prevent any bunching up or projection of the dress at the point of attachment.

Figure 1:
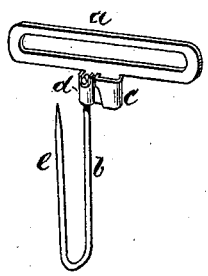
Figure 2:
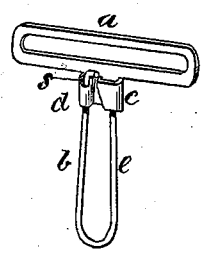
Figure 3:
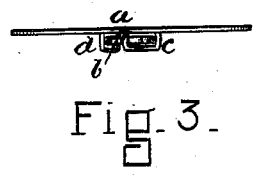

Referring to the drawings, Figure 1 represents a front view of my invention, with the hook open to receive the article to be attached. Fig. 2 is the same, with the pin closed within the shield. Fig. 3 is a top view of the same.

*a* represents a loop, which may be made of wire, or of sheet metal. Attached to the loop *a* is a shield or guard, *c*, of sheet metal, the two ends of which are bent around in front, one portion, *d*, turned in, so as to hold the longer side *b* of the hook, and allow it to turn freely in the same. The end *b* is prevented from slipping out by a bend or projecting end at the top, and in the upper edge of the part *d* is a notch or slot, into which the projecting end of the upper part of the hook *b* fits when the pointed portion *e* is at right angles with the loop *a*, as shown in Fig. 1, so as to hold the hook in that position, for the attachment of the garment. The portion *c* is bent around, and its edge is beveled from the upper part downward, so as to leave an opening for the insertion of the point *e* of the hook or pin.

In the drawing the loop *a* and the shield *c*, with the holder *d*, are shown as formed from one and the same piece of sheet metal; but the loop may be made of wire, having its ends turned down and connected to the shield *c* and the holder *d*, respectively; or the loop may be made with the ends meeting in the center on the under side, and the upper portion of the shield be bent over, and thus connected with the loop.

In operation the hook is arranged with the pointed portion *e* fixed at right angles with the loop *a* by means of the slot in the holder *d* and the projecting upper end of the arm *b*, as shown in Fig. 1. The article to be suspended is then passed over the hook *e*, and, when this is done, the hook is raised, so as to disengage the upper end of arm *b* from the notch in holder *d*, and allow the hook or pin to be turned when the point *e* is pressed inward and under the shield *c*, where it is securely held. By reversing the operation the pin is as readily detached from the shield, and the article of dress removed.

The loop may be provided with two or more hooks, if desirable, each being made to swivel and engage with a shield or catch, as above described.

What I claim as my invention is—

1. The combination of the loop *a*, the shield *c*, and swivel pin or hook *b e*, as and for the purpose set forth.

2. The combination, with a loop, *a*, of a swivel hook or pin, *b e*, provided with a locking device, substantially as and for the purpose specified.

In testimony whereof I have signed my name to this specification in the presence of two subscribing witnesses.

THOS. COGSWELL.

Witnesses:
J. H. ADAMS,
E. A. STOCK.